United States Patent Office 3,549,722
Patented Dec. 22, 1970

1

3,549,722
OLEFIN CONVERSION IN THE PRESENCE OF CYCLIC POLYENES
Filippo Pennella, Bartlesville, Okla., assignor to Phillips Petroleum Company, a corporation of Delaware
No Drawing. Filed Apr. 3, 1967, Ser. No. 627,683
Int. Cl. C07c 3/62
U.S. Cl. 260—683     6 Claims

ABSTRACT OF THE DISCLOSURE

Acyclic monoolefins are converted into other olefins of different molecular weights by contact with a promoted silica catalyst, active for disproportionating propylene into ethylene and butene, in the presence of a cyclic polyene.

---

This invention relates to the conversion of acyclic monoolefin hydrocarbons in the presence of a cyclic polyene to increase the activity of the catalyst utilized in the conversion. In one aspect this invention relates to the olefin reaction for the conversion of acyclic monoolefins in the presence of a catalyst comprising silica promoted with an oxide, sulfide or a hexacarbonyl of tungsten or molybdenum or with an oxide of rhenium, vanadium, niobium and tantalum. In still another aspect this invention relates to a method for increasing the activity of a catalyst in the olefin reaction by blending a small portion of cyclic polyene with the feed to the olefin reaction.

The olefin reaction is defined as a process for the catalytic conversion over a catalyst of a feed comprising one or more ethylenically unsaturated compounds to produce a resulting product which contains at least ten percent by weight of product compounds, which product compounds can be visualized as resulting from at least one primary reaction, as defined below, or the combination of at least one primary reaction and at least one unsaturated bond isomerization reaction, and wherein the sum of the compounds contained in said resulting product consisting of hydrogen, saturated hydrocarbons, and compounds which can be visualized as formed by skeletal isomerization but which cannot be visualized as formed by one or more of the above noted reactions, comprises less than twenty-five percent by weight of the total of said resulting product. Feed components and unsaturated bond isomers thereof are not included in the resulting product for the purpose of determining the above-noted percentages.

In the olefin reaction, as defined above, the primary reaction is a reaction which can be visualized as comprising the breaking of two existing unsaturated bonds between first and second carbon atoms and between third and fourth carbon atoms, respectively, and the formation of two new unsaturated bonds between said first and third and between said second and fourth carbon atoms. Said first and second carbon atoms and said third and fourth carbon atoms can be in the same or different molecules.

The olefin reaction according to this invention is illustrated by the following reactions:

(1) The disproportion of an acyclic monoolefin having

2 at least three carbon atoms into other acyclic monoolefins of both higher and lower number of carbon atoms; for example, the disproportionation of propylene yields ethylene and butenes.

(2) The conversion of an acyclic monoolefin having three or more carbon atoms and a different acyclic monoolefin having three or more carbon atoms to produce different acyclic olefins; for example, the conversion of propylene and isobutylene yields ethylene and isopentene;

(3) The conversion of ethylene and in internal acyclic monoolefin having four or more carbon atoms to produce other olefins having a lower number of carbon atoms than that of the acyclic monoolefin; for example, the conversion of ethylene and 4-methylpentene-2 yields 3-methylbutene-1 and propylene;

The olefin reaction conversion of olefins into other olefins has provided several processes which appear to have great commercial significance. The disproportionation of propylene into ethylene and butene is an example. As in all commercial catalytic processes, the activity of a specific catalyst is of great importance in that it reflects the amount of conversion that can be achieved over a given period of time, at a given temperature and over a given quantity of catalyst.

It is an object of this invention to provide a method for increasing the activity of a promoted silica catalyst in the olefin reaction. It is also an object of this invention to provide a method for minimizing or eliminating the induction period of a promoted silica catalyst in the conversion of acyclic monoolefins in the olefin reaction. Another object of this invention is to provide method for stimulating the activity of promoted silica olefin reaction catalyst during the induction period of the catalyst. Other aspects, objects and advantages of the invention will be apparent to one skilled in the art upon reading the disclosure including a detailed description of the invention.

According to the process of this invention a small amount of a cyclic polyene is added with the acyclic monoolefin feed stream to an olefin reaction process wherein a promoted silica catalyst, active for disproportionating propylene into ethylene and butene, is being used. It has been found that the presence of a small amount of a cyclic polyene in the feed stream of an olefin reaction process increases the conversion of an acyclic monoolefin at a given temperature and that the induction period generally experienced with a fresh or a freshly generated promoted silica olefin reaction catalyst is substantially reduced if not completely eliminated.

The cyclic polyenes which are applicable for use in the present invention are those having from about 5 to about 15 carbon atoms per molecule, and containing from about 2 to about 4 double bonds. The cyclic polyenes can be either monocyclic or bicyclic. Monocyclic non-conjugated dienes, such as 1,5-cyclooctadiene, are presently preferred. Some examples of other suitable cyclic polyenes are 1,3-cyclooctadiene, 1,4-cyclohexadiene, cyclooctatetraene, 1,5,9-cyclododecatriene, 1,4,7 - cyclopentadecatriene, bicyclo[3.3.0] - 2,7 - octadiene, bicyclo[3.2.1]-2,6-octadiene, and the like, and mixtures thereof.

The cyclic polyene can be added to the acyclic monoolefin feed stream in amounts which are effective to increase the conversion the desired amount. Optimum amounts for a specific olefin reaction process can be readily determined by routine experimentation. Ordinarily the cyclic polyenes are added in amounts ranging from about 0.01 to 5 percent by volume of the total olefin feed. The cyclic polyene is blended with the olefin feed before the contact with the olefin reaction catalyst. The blending can be carried out in any convenient manner. It can simply be dissolved in liquid olefin feed or vaporized and blended with a gaseous olefin feed stream. Except for the introduction of the cyclic polyenes to the olefin feed, the olefin reaction conversion process is carried out according to conventional techniques using conditions of operation which are known to be suitable for the specific olefin reaction catalyst utilized.

The silica component of the catalyst suitable for use according to the present invention can be any conventional catalyst grade silica. Because it is generally the major portion of the catalyst, the silica is, for convenience, referred to as the catalyst support. It should be understood, however, that the catalytic agent which has olefin reaction activity is the reaction product resulting from the admixture of silica and a suitable promoter material under activating conditions. The catalyst of this invention can contain other materials which do not substantially promote unwanted reactions. For example, the support can contain substantial amounts of magnesium oxide, or other materials in amounts which do not change the essential characteristics of the olefin reaction conversion process.

The catalysts suitable for use in the process of this invention can be prepared by incorporating into a silica-containing base suitable tungsten, compounds, by conventional methods such as, for example, impregnation, dry mixing, coprecipitation. Suitable tungsten compounds include tungsten oxide and compounds convertible to these oxides. The finished catalyst can be in the form of powders, granules, agglomerates, pellets, spheres, extrudates, and the like, depending upon the type of contacting technique employed in the reaction.

Sufficient promoter is utilized to obtain the desired activity in the promoted silica catalyst. Since he promoter compounds usually are more expensive than the support material, unnecessarily large amounts are ordinarily not used. Generally the finished catalyst contains from 0.1 percent to about 30 percent by weight of the selected promoter. However, larger amounts can be used. In most instances, a preferred amount of the promoter is from 1 percent to about 20 percent by weight.

The catalyst utilized in the present invention can be prepared by any conventional method. A common method for preparing the tungsten oxide-silica catalyst comprises impregnating the silica with the tungsten compound convertible to the oxide, for example, ammonium tungstate, by wetting the silica with an aqueous solution of ammonium tungstate, evaporating water and activating the composite catalyst by heating same in a stream of dry air at a temperature of about 1100° F. for a period of one-half hour or longer. The ammonium tungstate is considered to be converted to the oxide during this activation treatment.

Olefins applicable for use in the invention are acyclic monoolefins having at least 3 carbon atoms per molecule and cycloalkyl and aryl derivatives thereof; mixtures of such olefins; and mixtures of ethylene and such olefins. Many useful reactions are accomplished with such olefins haviny 3–30 carbon atoms per molecule.

Some specific examples of acyclic monoolefins suitable for reactions of this invention include propylene; 1-butene; isobutene; 2-butene; 1-pentene; 2-pentene; 1-hexene; 2-heptene; 1-octene 2-nonene; 1-dodecene; 2-tetradecene; 1-hexadecene; 2-methyl-1-butene; 2-methyl-2-butene; 3-methyl-1-butene; 1-phenylbutene-2; 4-octene; 3-eicosene; and 3-heptene; and the like; and mixtures thereof.

The operating temperature for the olefin reaction process of this invention is in the range of about 400 to 1100° F. When using the tungsten-oxide silica catalyst for the disproportionation of propylene, the preferred operating temperature would be in the range of about 600 to 900° F. For higher molecular weight olefin conversions the preferred temperatures will be somewhat lower.

Generally, the olefin reaction conversions are essentially independent of pressure, except as pressure affects the density of the feed and thus the contact time. Furthermore, an increase in operating pressure usually results in lower operating temperature at constant conversion levels. Pressures in the range of 0 to about 1500 p.s.i.g. and higher are suitable.

With a fixed bed reactor and continuous flow operation hourly space velocities in the range of about 0.5 to 100 parts by weight of hydrocarbon feed per part by weight of catalyst per hour are suitable, with excellent results having been obtained in the range of 1 to 200. The space velocities of the examples are within the above range.

The olefin reaction can be carried out either in the presence or absence of a diluent. Paraffinic and cycloparaffinic hydrocarbons will often be employed. Suitable diluents include propane, cyclohexane, methylcyclohexane, n-pentane, n-hexane, isooctane, dodecane, and the like or mixtures thereof, including primarily those paraffins and cycloparaffins having up to about 12 carbon atoms per molecule. Other diluents can be used provided the diluent is nonreactive under the conditions of the olefin reaction process.

The following specific embodiments of the invention will be helpful in attaining an understanding of the invention, but should not be construed as unduly limiting the invention.

EXAMPLE I

Measured amounts of 1,5-cyclooctadiene were added to a propylene disproportionation feed using a fixed bed reactor charged with silica-supported tungsten oxide containing about 7 weight percent tungsten oxide. The catalyst was pretreated with air a 600° C. for 1 hour, then flushed with nitrogen for 20 minutes to prepare it for use.

When propylene was passed through this catalytic bed at 400° C. and at a rate of 50 cc. of gas per cc. of catalyst per minute, the conversion after 1 hour was only 0.7 percent.

When the run was repeated using a feedstream of 99 volume percent propylene and 1 volume percent 1,5-cyclooctadiene (1,5-COD) and under the same conditions, the conversion was found to be 14 percent.

In another run in which 98 volume percent propylene and 2 volume percent 1,5-cyclooctadiene was passed over the same activated catalyst (which had been pretreated with propylene at 500° C. for 1 hour) at 350° C. and 100 cc. gas per cc. of catalyst per minute, propylene conversion was found to be 20 percent. Under the same conditions, but in the absence of the cyclooctadiene, conversion was 0–0.1 percent.

EXAMPLE II

A silica-supported tungsten oxide catalyst (containing about 7 weight percent tungsten oxide, and previously used for propylene disproporionation) was regenerated with air at 600° C. for 1 hour, then flushed with nitrogen for 20 minutes. Propylene was passed over the catalyst at 50 cc. gas/minute, at 500° C., and at atmospheric pressure. The propylene conversion at different times within the first hour of operation was noted.

Using the same catalyst (regenerated with air and flushed with nitrogen as before) propylene was again passed over the catalytic bed under the same conditions except that 0.57 cc. gas/minute of 1,5-cyclooctadiene was also fed into the feedstream.

Again, the degree of conversion during the early part of the test was noted. The results of these two runs are shown in Table I below:

TABLE I

| No 1,5-COD in feed | | 1 vol. percent 1,5-COD in feed | |
|---|---|---|---|
| Time on stream, min. | Conversion, percent | Time on stream, min. | Conversion, percent |
| 5 | 6.2 | 5 | 40.6 |
| 13 | 24.4 | 11 | 42.2 |
| 22 | 30.7 | *15 | |
| 38 | 33.5 | 30 | 40.7 |
| 55 | 35.5 | 50 | 38.5 |

*At this point, the flow of 1,5-COD into the feedstream was halted.

The data in the table above clearly show that the presence of the 1,5-cyclooctadiene in the feedstream not only results in greater conversion of propylene but that this high conversion rate is achieved very quickly, particularly when compared to the run carried out in the absence of the cyclic diolefin.

EXAMPLE III

Using the same procedure, the same apparatus, and same, similarly activated catalyst, propylene was disproportionated in a series of runs in which the propylene feedstream contained 4.3 volume percent of 1,5-cyclooctadiene. The results of this series of runs are shown in the following Table II.

TABLE II
[Effect of 4.3 vol. percent 1,5-COD on conversion of propylene]

| Time on stream | Temp., °C. | Rate (cc. gas/min.) Propylene | Rate (cc. gas/min.) 1,5-COD | Percent propylene conversion |
|---|---|---|---|---|
| 1 hr. 30 min | 500 | 45 | 0 | 37 |
| 1 hr. 50 min | 450 | 45 | 0 | 10 |
| 2 hr. 0 min | | Addition of 1,5-COD was started | | |
| 2 hr. 10 min | 450 | 45 | 2 | 56 |
| 2 hr. 45 min | 400 | 45 | 2 | 43 |
| 3 hr. 0 min | 350 | 45 | 2 | 43 |
| 3 hr. 15 min | 300 | 45 | 2 | 23 |
| 3 hr. 35 min | | Addition of 1,5-COD was stopped | | |
| 4 hr. 7 min | 350 | 45 | 0 | 6.5 |
| 4 hr. 30 min | 350 | 45 | 0 | 1.4 |
| 4 hr. 35 min | 350 | Addition of 1,5-COD was resumed | | |
| 4 hr. 48 min | 350 | 45 | 2 | 39 |

The data in the table above show that, in the presence of 1,5-cyclooctadiene, the conversion of propylene is increased at several different temperature levels. However, the promoting effects of the cyclooctadiene are not permanent. When the flow of this modifying agent is halted, the conversions rapidly fall off.

The promoting effect of the 1,5-cyclooctadiene was also observed in a run wherein the modifying agent was present at a 0.6 volume percent level in the propylene feed. In a run at 450° C., atmospheric pressure, and a 100 cc./minute flow rate, the propylene conversion was 35.5 percent in the presence of the cyclooctadiene. However, 15 minutes after the addition of the cyclooctadiene had been stopped, the conversion fell to 10.7 percent.

The addition of 1,3-cyclooctadiene has been shown to have similar beneficial effects.

EXAMPLE IV

Runs were made with a freshly regenerated tungsten oxide-silica catalyst as in Example I, to disproportionate propylene using various concentrations of 1,5-cyclooctadiene in the propylene feed. The runs were made at 300 p.s.i.g., 775° F. and 60 parts by weight of feed per part by weight of catalyst per hour. The results of these runs are shown in the following Table III.

TABLE III

| | Run No. | | | |
|---|---|---|---|---|
| | 1 | 2 | 3 | 4 |
| COD in feed, wt. percent | 0 | 0.1 | 0.5 | 1.0 |
| Percent propylene conversion at, minutes: | | | | |
| 5 | 2.7 | 7.9 | 16.0 | 24.5 |
| 20 | 10.5 | 24.4 | 35.5 | 42.3 |
| 35 | 17.3 | 30.0 | 41.4 | 44.3 |
| 50 | 18.6 | *20.6 | *20.9 | *16.9 |
| 65 | 25.3 | *25.2 | *23.1 | *18.2 |
| 80 | **41.7 | | | |

*COD removed from feed.
**0.5 wt. percent COD added to feed.

The above data show that small amounts of a cyclic polyene are effective in increasing the activity of the freshly regenerated catalyst under conditions suitable for commercial operation.

That which is claimed is:

1. In the olefin reaction process wherein at least one acylic monoolefin having at least three carbon atoms per molecule or a mixture of such olefins or a mixture of at least one such olefin with ethylene is contacted with an olefin reaction catalyst active for disproportionating propylene into ethylene and butene and comprising silica and a promoting amount of an oxide of tungsten under conditions, including conditions of temperature, pressure and contact time, suitable for obtaining a product of the olefin reaction which, as defined herein, can be visualized as comprising the reaction between two first pairs of carbon atoms, the two carbon atoms of each first pair being connected by an olefin double bond, to form two new pairs from the carbon atoms of said first pairs, the two carbon atoms of each said new pairs being connected by an olefinic double bond, the improvement comprising contacting said catalyst with said acylic monoolefin in admixture with a cyclic polyene in an amount in the range of about 0.01 to 5 volume percent, based on the acyclic monoolefin, sufficient to increase the activity of the catalyst for the olefin reaction.

2. The process of claim 1 wherein said cyclic polyene has about 5 to 15 carbon atoms per molecule and contains from 2 to about 4 double bonds, said polyene is blended with the acyclic monoolefin and the blend is contacted with the catalyst.

3. The process of claim 2 wherein the temperature is in the range of about 400 to 1100° F. and the pressure is in the range of 0 to about 1500 p.s.i.g.

4. The process of claim 3 wherein the cyclic polyene is 1,5-cyclooctadiene.

5. The process of claim 3 wherein the cyclic polyene is 1,3-cyclooctadiene.

6. The process of claim 3 wherein the olefin reaction is the disproportionation of propylene into ethylene and butene.

References Cited

UNITED STATES PATENTS

| 3,083,246 | 3/1963 | Holzman et al. | 260—683.15 |
| 3,261,879 | 7/1966 | Banks | 260—683 |
| 3,365,513 | 1/1968 | Heckelsberg | 260—683 |
| 3,424,811 | 1/1969 | Mango | 260—680 |

DELBERT E. GANTZ, Primary Examiner

C. E. SPRESSER, JR., Assistant Examiner

U.S. Cl. X.R.

260—668, 680, 669